(12) United States Patent
Howard et al.

(10) Patent No.: US 10,392,219 B2
(45) Date of Patent: Aug. 27, 2019

(54) METHOD OF SPOOLING A BI-METALLIC PIPE

(71) Applicants: Brett Howard, Aberdeenshire (GB); Jean Louis Hoss, Juziers (FR)

(72) Inventors: Brett Howard, Aberdeenshire (GB); Jean Louis Hoss, Juziers (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/070,664

(22) Filed: Mar. 15, 2016

(65) Prior Publication Data
US 2016/0194176 A1 Jul. 7, 2016

Related U.S. Application Data

(63) Continuation of application No. 14/295,111, filed on Jun. 3, 2014, now abandoned, which is a continuation
(Continued)

(30) Foreign Application Priority Data

Jul. 24, 2008 (GB) .................................. 0813545.1

(51) Int. Cl.
*F16L 1/20* (2006.01)
*B65H 55/00* (2006.01)
*B65H 55/04* (2006.01)

(52) U.S. Cl.
CPC ............. *B65H 55/04* (2013.01); *B65H 55/00* (2013.01); *F16L 1/203* (2013.01);
(Continued)

(58) Field of Classification Search
CPC . F16L 1/203; F16L 1/206; F16L 1/161; F16L 1/165; F16L 1/163; F16L 13/02; Y10T 29/49828
(Continued)

(56) References Cited

U.S. PATENT DOCUMENTS 3,180,130 A 4/1965 Avera ........................... 72/466.2
3,890,693 A 6/1975 Eagleton et al. ................ 29/429
(Continued)

FOREIGN PATENT DOCUMENTS

GB 1517955 7/1978
GB 2461954 A * 1/2010 .............. F16L 1/203
(Continued)

OTHER PUBLICATIONS

Response to Notice of Opposition filed in European Patent No. 2304293B dated Jul. 8, 2013.
(Continued)

*Primary Examiner* — Christopher M Koehler
(74) *Attorney, Agent, or Firm* — Ostrolenk Faber LLP (57) ABSTRACT

A method of spooling a marine pipeline (90) including a plurality of bi-metallic pipe sections (10) (66) onto a reel (60) including at least the steps of: (a) filling a first pipe section with a fluid (12); (b) spooling the first pipe section onto the reel; (c) filling a second pipe section with a fluid (78); (d) joining the first pipe section with the second pipe section wherein at least one of the first and second pipe sections maintains the fluid (12,78) therein; and (e) spooling the second pipe section onto the reel.

16 Claims, 4 Drawing Sheets

Related U.S. Application Data of application No. 13/054,600, filed as application No. PCT/GB2009/050899 on Jul. 22, 2009, now Pat. No. 8,806,735.

(52) U.S. Cl.
CPC ....... *B65H 2701/33* (2013.01); *Y10T 29/4998* (2015.01); *Y10T 29/49826* (2015.01); *Y10T 29/49863* (2015.01); *Y10T 29/49904* (2015.01)

(58) Field of Classification Search
USPC .... 29/469, 446, 527.1, 430, 428; 405/154.1, 405/168.1, 168.2, 168.3, 168.4, 169, 170, 405/171; 242/370, 176, 475.1
See application file for complete search history.

(56) References Cited

U.S. PATENT DOCUMENTS

| | | | |
|---|---|---|---|
| 4,332,073 A | 6/1982 | Yoshida et al. | 29/421 R |
| 4,493,203 A | 1/1985 | Wheeler | 72/369 |
| 5,090,608 A | 2/1992 | Jones | 228/49.3 |
| 6,540,440 B1 | 4/2003 | Beaujean | 405/168.1 |
| 7,927,040 B2 * | 4/2011 | Wilson | B63B 35/03 405/158 |
| 8,226,327 B2 | 7/2012 | Endal et al. | 405/154.1 |
| 8,235,628 B2 | 8/2012 | Lamison | 405/168.3 |
| 8,806,735 B2 * | 8/2014 | Howard | F16L 1/203 242/475.1 |
| 8,864,417 B2 * | 10/2014 | Tkaczyk | F16L 1/19 405/168.3 |
| 8,894,327 B2 | 11/2014 | Mair et al. | 405/168.3 |
| 2006/0210361 A1 * | 9/2006 | Lamison | F16L 1/161 405/168.3 |
| 2008/0163676 A1 | 7/2008 | Carson | 73/49.1 |
| 2008/0209986 A1 | 9/2008 | Carson | 73/49.8 |
| 2008/0211228 A1 | 9/2008 | Carson | 285/151.1 |
| 2010/0028085 A1 | 2/2010 | Rocher | 405/169 |
| 2010/0034590 A1 | 2/2010 | Endal et al. | 405/166 |
| 2010/0034591 A1 | 2/2010 | Wilson | 405/168.3 |
| 2012/0257931 A1 | 10/2012 | Tkaczyk et al. | 405/168.3 |
| 2012/0269581 A1 | 10/2012 | Mair et al. | 405/168.1 |
| 2013/0034390 A1 | 2/2013 | Mair et al. | 405/168.3 |
| 2013/0195557 A1 | 8/2013 | Bertaso et al. | 405/168.3 |
| 2014/0284413 A1 * | 9/2014 | Howard | F16L 1/203 242/176 |
| 2015/0337995 A1 * | 11/2015 | Pepin | F16L 1/203 138/155 |

FOREIGN PATENT DOCUMENTS

| | | | |
|---|---|---|---|
| GB | 2474713 | 4/2011 | |
| GB | 2479379 | 10/2011 | |
| JP | 02046388 A | 2/1990 | |
| WO | WO 97/34101 | 9/1997 | |
| WO | WO 2004/011837 | 2/2004 | |
| WO | WO 2008/072970 | 6/2008 | |
| WO | WO 2010/064082 | 6/2010 | |
| WO | WO 2011051218 A1 * | 5/2011 | ............. F16L 1/161 |
| WO | WO 2011051221 A1 * | 5/2011 | ............. F16L 1/161 |

OTHER PUBLICATIONS

Opponent's Counter Reply to the Jul. 8, 2013 Response in European Patent No. 2304293B dated Nov. 19, 2013.
International Search Report dated Jul. 19, 2010 issued in corresponding PCT International Application No. PCT/GB2009/050899.
Notification Concerning Transmittal of International Preliminary Report on Patentability and Written Opinion of the International Searching Authority dated Feb. 3, 2011 issued in corresponding International Application No. PCT/GB2009/050899.
H. Ilstad et al., "Strengthening Effect from Steel Pipe Cladding in Pure Bending", *Proceedings of OMAE2006, 25th International Conference on Offshore Mechanics and Arctic-Engineering*, p. 1, Jun. 4-9, 2006.
EPO Communication of a notice of opposition dated Mar. 12, 2013.
Notice of Opposition—Statement of Grounds dated Feb. 28, 2013.
EPO Opposition Decision issued in European Application No. 09 785 373.3-1751 dated Jul. 9, 2015.
Letter dated Nov. 11, 2010 filed at the EPO during the prosecution of European Application No. 07851986.5.

* cited by examiner

METHOD OF SPOOLING A BI-METALLIC PIPE

CROSS REFERENCE TO RELATED APPLICATIONS

The present application is a continuation of pending U.S. patent application Ser. No. 14/295,111, filed Jun. 3, 2014 and published on Sep. 25, 2014 as U.S. Patent Application Publication No. 2014/0284413, which in turn is a continuation of U.S. patent application Ser. No. 13/054,600, filed Apr. 12, 2011 and issued on Aug. 19, 2014 as U.S. Pat. No. 8,806,735, which application was a U.S.C. § 371 National Phase conversion of PCT/GB2009/050899, filed Jul. 22, 2009, which claims benefit of British Application No. 0813545.1, filed Jul. 24, 2008, the contents of each of these applications are incorporated in full by reference herein. The PCT International Application was published in the English language.

BACKGROUND OF THE INVENTION

The present invention relates a method of spooling a marine pipeline.

Corrosion resistance pipelines for the marine or otherwise underwater transportation or conveying of corrosive fluids such as gas or crude oil can be provided by pipes having an internal metallic liner. A double-walled or bi-metallic pipe is generally composed of two metallic layers. The outer layer is for resisting hydrostatic pressure, and/or internal pressure depending on the water depth, whilst the internal layer prevents damage to the outer layer from the chemical composition of the fluid being conveyed. The inner layer is sometimes also termed a "liner". As one of its main purposes is to protect the outer layer from corrosion, commonly a corrosion resistant alloy (CRA) is chosen for the liner.

One form of bi-metallic pipe is a single "clad" pipe having an internal CRA layer metallurgically bonded to the outer layer, which could be formed from a carbon steel base metal.

A second form of bi-metallic pipe can be termed a 'lined' pipe, where a CRA liner is fixed to the outer layer such as carbon steel without metallurgical bonding. An economic method of forming a lined pipe uses hydraulic expansion, where the CRA liner is inserted into the outer layer, and then both parts are expanded. During the expansion, the outer layer undergoes an elastic deformation while the inner pipe undergoes a plastic deformation.

There are two common methods of laying underwater or marine pipelines. The 'stove piping method' involves assembling pipe stalks on a marine pipe-laying vessel, and then welding each one as the laying progresses. In the 'reeled laying method', the pipeline is assembled onshore and spooled onto a large reel, sometimes also termed a storage reel or drum, and then unwound from the reel as the pipe is being laid. Once offshore, the pipeline is unwound from the reel and is directly available for laying because no welding is required during the offshore operation.

The reeled laying method is faster than the stove piping method, such that it is preferred where possible. However, the reeling process generates bending on the pipeline, which would cause a lined pipe to wrinkle and/or to bend. Thus, there has hitherto been no actual use or commercial application of the reeled lay method for bi-metallic pipes.

WO 2008/072970 A1 discloses a method for laying a pipeline having an inner corrosion proof metallic cladding that is closely fitted with metallic contact to an outer pipe material. In its method, a section of the pipeline is reeled onto a pipe laying drum whilst an overpressure is maintained within the section by means of a pressurised fluid. When the pipeline is motionless, the overpressure is relieved, and a further pipeline section is joined to the first section. A new overpressure is then applied within the sections, and the further section is reeled onto the pipe laying drum.

Whilst this method may assist to avoid deformation when the pipeline sections have no "mechanical movement" (which is defined in WO 2008/072970 A1 as meaning reeling the pipeline onto or unwinding the pipeline from the pipe laying drum), this method requires the overpressuring and pressure-relieving steps every time two pipe sections are joined. The pipe laying drum is described in WO 2008/072970 A1 as typically having installed "many" pre-fabricated sections, creating significant multiplication of the overpressuring and pressure-relieving steps required.

SUMMARY OF THE INVENTION

One object of the present invention is to provide a simpler method of spooling a bi-metallic pipe onto a reel.

According to a first aspect of the present invention, there is provided a method of spooling a marine pipeline comprising a plurality of bi-metallic pipe sections onto a reel, the method comprising at least the steps of:
(a) filling a first pipe section with a fluid;
(b) spooling the first pipe section onto the reel;
(c) filling a second pipe section with a fluid;
(d) joining the first pipe section with the second pipe section wherein at least one of the first and second pipe sections maintains the fluid therein; and
(e) spooling the second pipe section onto the reel.

By maintaining the fluid in at least one of the first and second pipe sections, preferably both pipe sections, during their joining, the method of the present invention is significantly simplified allowing faster spooling to be effected.

The composition, nature and formation of bi-metallic pipe sections are known in the art. Each pipe section may comprise any suitable size, design and shape.

In one embodiment of the present invention, each pipe section is pre-assembled from a number of smaller pipe sections prior to use with the present invention. Thus, the pipe sections may extend from several meters long up to 1 km, or be approximately 1 km long, or be greater than 1 km long.

The present invention relates to all forms of bi-metallic pipe sections, preferably lined pipe sections comprising a CRA liner fixed to an outer layer.

Each pipe section may be filled with the same or a different fluid. Fluids include all suitable liquids and/or gases, preferably being able to be pressurised. Water or water-based fluids are typical fluids that are usable in the present invention.

Methods and apparatus for joining two pipe sections that are well known in the art are not described herein in detail. Generally the joining comprises one or more welds, such as tie-in welds. The two pipe sections form a combined pipe section. Once a first pipe section and a second pipe section are joined, the so-formed combined pipe section can become a new "first pipe section" for the method of the present invention, such that steps (c)-(e) can be repeated by the addition of another second pipe section, so as to join and spool one or more further second pipe sections onto the reel. Typically, a reeled pipeline for subsequent laying via the reeled lay method can be many pipe sections, and so many kilometers, long.

Each fluid may be pressurised prior to its use to fill a pipe section, such that the method of the present invention could comprise pressurising the fluid in the first pipe section prior to step (a) and/or pressurising the fluid in the second pipe section prior to step (c).

Preferably, the method comprises pressurising the fluid in the first pipe section after step (a) and/or pressurising the fluid in the second pipe section after step (c).

Methods of pressurising a fluid are known in the art. The fluid may be pressurised to a pressure greater than 5 bar, preferably in the range 8-12 bar such as 10 bar. A maximum pressure for the fluid depends upon the nature and dimensions of the pipe sections, such that a general maximum of 25 bar will generally suit most known pipe sections.

Preferably the same fluid is used in the first pipe section as the second pipe section, and the or each subsequent pipe section to be joined, and more preferably the same fluid is water.

Means to retain the fluid in a pipe section may include any suitable apparatus, device or unit, and is hereinafter termed a "plug". Plugs may be movable or stationary, and are preferably lockable to provide fluid resistance or sealing once located at a desired location at, in, or along the length of a pipe section. One suitable plug can be based on a pig. Other (separate or attached) plugs or pigs may also be suitable to assist movement of a plug along a pipe section of pipeline.

In one embodiment of the present invention, step (a) further comprises the steps of:
locating a first plug at one end of the first pipe section;
filling the first pipe section with a fluid;
locating a second plug at the other end of the first pipe section;
pressurising the fluid; and
locking the second plug to maintain the pressurised fluid in the first pipe section.

In another embodiment of the present invention, step (c) further comprises the steps of:
locating a first plug at one end of the second pipe section;
filling the second pipe section with a fluid;
locating a second plug at the other end of the second pipe section;
pressurising the fluid; and
locking the second plug to maintain the pressurised fluid in the second pipe section.

Two or more plugs may be attached, suitably by one or more lines, to allow for combined movement. At least one plug may be attached to another plug or pig for movement along a pipe section.

Preferably, there is an absence of fluid in the areas of the first and second pipe sections being joined in step (d). A plug being used at the end of a pipe section may be located near to the end of the pipe section to create a portion of the end of the pipe section free of fluid thereunder. Thus, locating a plug "at" an end of a pipe section includes locating a plug "at or near" an end of a pipe section. The skilled user is aware of the portion of a pipe section end required to form a join, generally by one or more welding processes or operations, with another pipe section end.

Where there is an absence of fluid in the areas of the first and second pipe sections being joined, preferably the method further comprises subsequently filling the first and second pipe sections beneath the join with a fluid, preferably the same fluid in the first and/or second pipe sections. More preferably, the fluid to be located beneath the join is provided from the first and/or second sections by movement of one or more plugs thereacross.

In another embodiment of the present invention, one or more plugs are relocated after joining the first and second plug sections so as to alter the number of plugs in the combined pipe section and/or the distribution of fluid in the combined pipe section.

In one embodiment of the present invention, the method of the present invention comprises at least the steps of:
(i) locating a plug at one end of the first pipe section;
(ii) filling the first pipe section with a fluid, preferably water;
(iii) locating a second plug at the other end of the first pipe section;
(iv) pressurising the fluid in the first pipe section;
(v) locking the second plug to maintain the pressurised fluid in the first pipe section;
(vi) spooling the first pipe section onto the reel;
(vii) locating a first plug at one end of the second pipe section;
(viii) filling the second pipe section with a fluid, preferably water;
(ix) locating a second plug at the other end of the second pipe section;
(x) pressurising the fluid in the second pipe section;
(xi) locking the second plug to maintain the pressurised fluid in the second pipe section;
(xii) joining the first pipe section beyond its first or second plug with the second pipe section beyond its first or second plug to provide a join;
(xiii) filling the first and second pipe sections beneath the join with a fluid, preferably water;
(xiv) moving at least one plug of the first pipe section across the join;
(xv) moving one plug of the first pipe section to the location of one plug of the second pipe section, and optionally withdrawing the first and second plugs of the second pipe section from the second pipe section;
(xvi) spooling the second pipe section onto the reel; and
(xvii) repeating steps (vii) to (xvi) with another second pipe section.

Two or more of the above steps may occur simultaneously and/or not sequentially as listed. The action of spooling a pipe section and/or a combined or joined pipe section onto a reel, and the shape, dimensions and/or use of a reel, are known in the art.

According to the second aspect of the present invention, there is provided a marine pipeline comprising a plurality of joined bi-metallic pipe sections located on a reel wherein each pipe section comprises a pressurised fluid, preferably water.

According to a third aspect of the present invention, there is provided a method of joining two marine pipeline bi-metallic pipe sections, each pipe section having a fluid therein enclosed by first and second plugs at respective ends of the pipe sections, comprising at least the steps of;
(a) connecting opposing plugs of the first and second pipe sections;
(b) joining the first and second pipe sections;
(c) filling the first and second pipe sections beneath the join with a fluid; and
(d) moving one of the connected plugs across the join.

The method of joining two marine pipeline bi-metallic pipe sections is usable with the method of spooling of marine pipeline as defined herein. Indeed, the present invention encompasses all combinations of various embodiments or aspects of the invention described herein. It is understood that any and all embodiments of the present invention may be taken in conjunction with any other embodiment to describe additional embodiments of the present invention.

Furthermore, any elements of an embodiment may be combined with any and all other elements from any of the embodiments to describe additional embodiments.

BRIEF DESCRIPTION OF THE DRAWINGS

Embodiments of the present invention will now be described by way of example only, and with reference to the accompanying drawings in which.

DESCRIPTION OF PREFERRED EMBODIMENTS

The present invention provides a method of spooling a marine pipeline comprising of plurality of bi-metallic pipe sections onto a reel, preferably for use in a subsequent reeled lay method for laying the pipeline offshore. Because the spooling process generates bending on the pipe sections, which may cause a bi-metallic pipeline to wrinkle or bend, the present invention provides a simplified method of being able to spool bi-metallic pipe sections onto a reel. With even a small internal pressure, the bending moment of a bi-metallic pipeline is acceptable with respect to the spooling process, so that wrinkling of the pipeline is avoided. The present invention provides a method of spooling such a pipeline whilst maintaining an internal preferably hydrostatic pressure in at least first and second pipe sections.

Referring to the drawings, the presence of a fluid in a pipe section or a combined pipe section is shown in the accompanying drawings by diagonal hatching.

FIGS. 1(a)-(g) show the step of filling a first pipe section 10 with a fluid such as water 12. The first pipe section 10 could be approximately 1 km long, and pre-assembled from a number of smaller pipe sections FIG. 1 (a) shows a first pipe section 10, one end of which is attached to a pig catcher 14, and the other end of which is attached to a pig launcher 16. Various types and designs of pigs are known in the art, and pigs are generally designed and arranged to flow freely through a pipeline, and to be conveyed forward along the pipeline by the pressure of fluid therein.

A first plug 18, operable with the pig catcher 14 and the pig launcher 16, and optionally being or being developed from a conventional pig, is able, adapted, or otherwise temporarily attached to another pig, to move along a pipe section or pipeline such as the first pipe section 10. The first plug 18 is preferably able to isolate air from water, be movable by low hydrostatic pressure and have low friction with an inner pipe wall, be lockable in position, and be able to withstand at least +25 bar of pressure, as well as being suitable to tow a low drag pull line.

Figure 3:
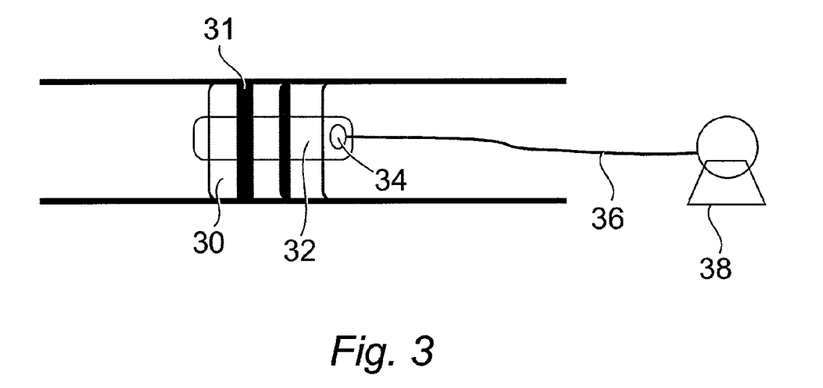
FIG. 3 shows a diagrammatic cross-sectional view of a plug at one end of a pipe section.

FIG. 3 shows an example of a suitable plug 30 comprising a locking device 31, a power and remote module 32, and an eye 34 to which a buoyant tow line 36 can be attached from a winch 38.

Figure 1:
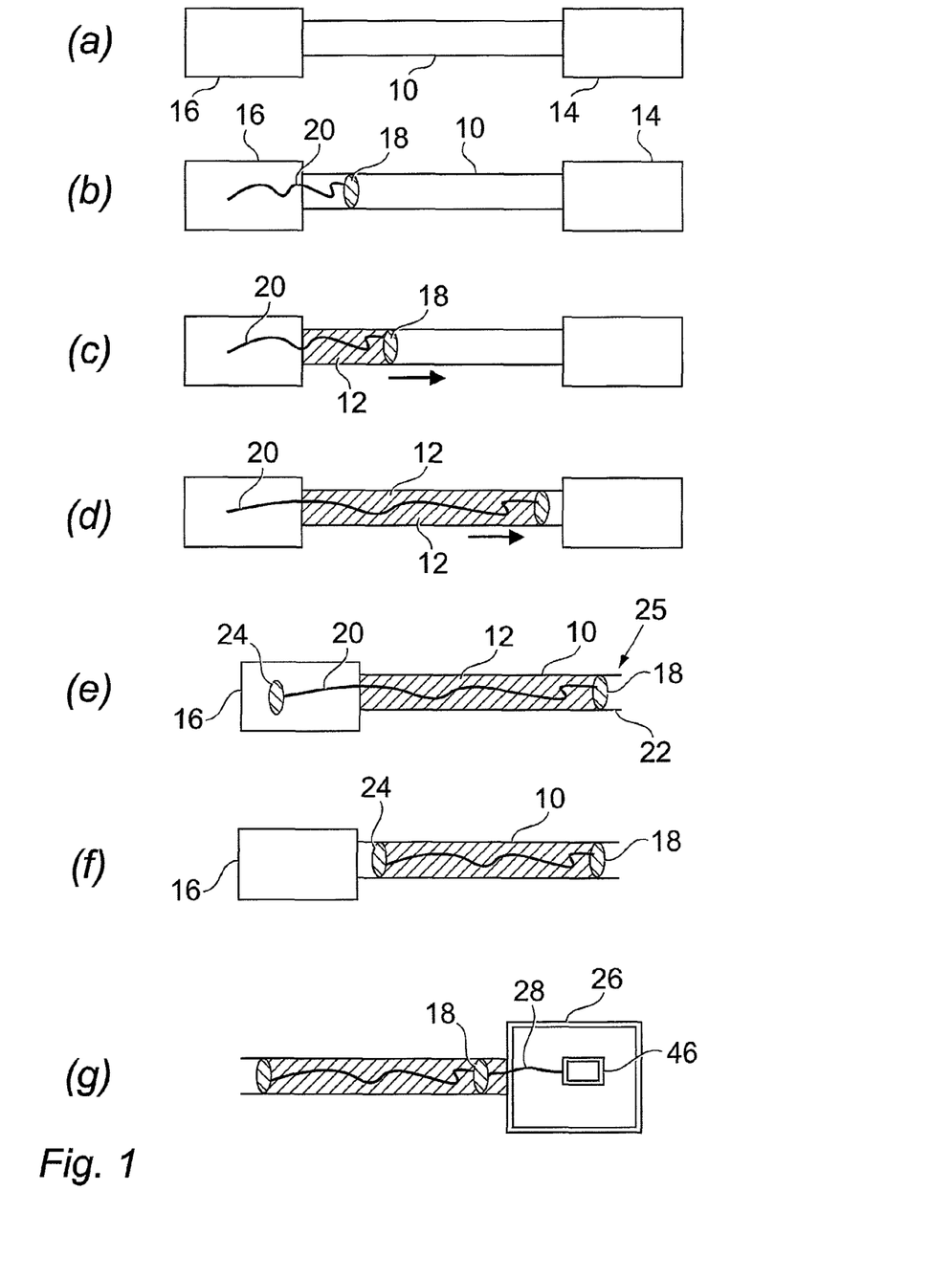
FIGS. 1(a)-(g) are diagrammatic cross-sectional views of the filling of a first pipe section with a fluid.

FIG. 1 (b) shows the pig launcher 16 launching the first plug 18, to which is attached a first line 20. The line could be plastic. Preferably, the first line 20 is a buoyant line or tow line made of, for example, polyethylene.

As a fluid such as water 12 is pumped either in or through the pig launcher 16 into the first pipe section 10, the first plug 18 progressively penetrates along the inside of the first pipe section 10 as shown in FIG. 1 (c). As the water 12 further pushes the first plug 18 along, the first line 20 is further deployed along the first pipe section 10 as shown in FIG. 1(d).

Sufficient water 12 is pumped into the first pipe section 10 until the first plug 18 is located at a distal or downstream end 22 of the first pipe section 10 as shown in FIG. 1(e), which also shows the attachment of a second plug 24 to the free end of the first line 20 in the pig launcher 16. The second plug 24 is then located at the first or other end of the first pipe section as shown in FIG. 1(f) to maintain the water 12 in the first pipe section 10.

In general, the or each plug is preferably located and/or locked at a location near to the end of a pipe section, such that there remains a final portion 25 of each pipe section which is free from fluid.

FIGS. 1 (a)-(f) show one example of step (a) of the method of the present invention.

Figure 4:
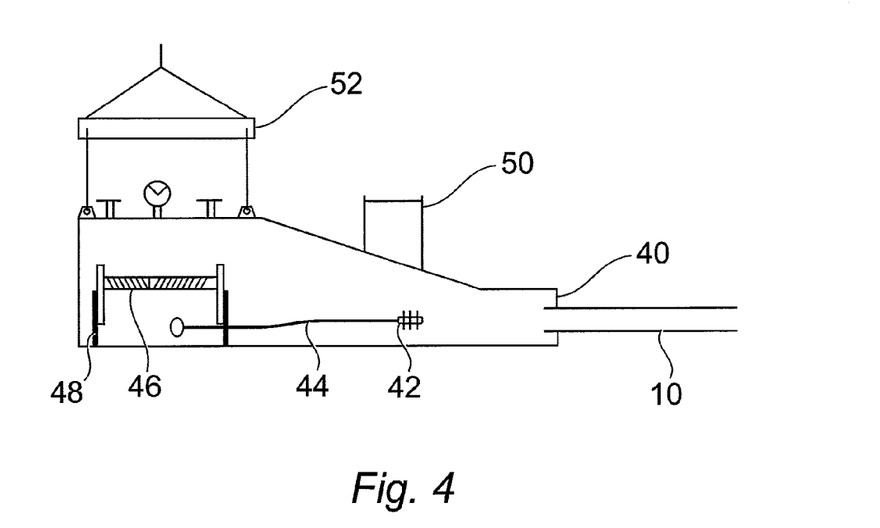
FIG. 4 shows a schematic side view of a clampable pressure chamber.

The water 12 may be provided as a pre-pressurised fluid. Alternatively, a suitable chamber such as a clampable pressure chamber 26, is installed at the downstream end of the first pipe section 10 as shown in FIG. 1 (g). An example of a suitable clampable pressure chamber is shown schematically in FIG. 4, showing a clamp 40 and a plug 42 having an attached buoyant line 44, the other end of which is attached to a pulling winch 46 having a power rack 48. A manhole 50 can be provided for visual inspection. FIG. 4 also shows a lifting means 52 able to locate and/or remove the clampable pressure chamber when required.

FIG. 1 (g) shows the attachment of the free or previously non-attached side of the first plug 18 to a second line 28, (the second line 28 optionally being the plug 42 and buoyant line 44 shown in FIG. 4). In this way, the first plug 18 is attached to the pulling winch 46, and the final portion 25 of the downstream end of the first pipe section 10, which was previously dry, can now be filled with water. Pressure can now be applied through the clampable pressure chamber 26 to increase the pressure of the water 12 in the first pipe section 10, optionally through one or more remote control valves in the first plug 18, and optionally until there is a pressure of approximately 10 bar. The first plug 18 can then be fully locked.

With pressurised fluid therein, the first pipe section 10 can then be spooled onto a reel (such as reel 60 shown in FIG. 5) in a manner known in the art. Spooling of a bi-metallic pipe section having an internal hydrostatic pressure limits the bending moment of the pipe section with respect to the spooling process, such that wrinkling is avoided. Preferably, the pressure of the fluid 12 in the first pipe section 10 is maintained whilst the first pipe section 10, now located on a reel, is joined to a second pipe section.

Figure 2:
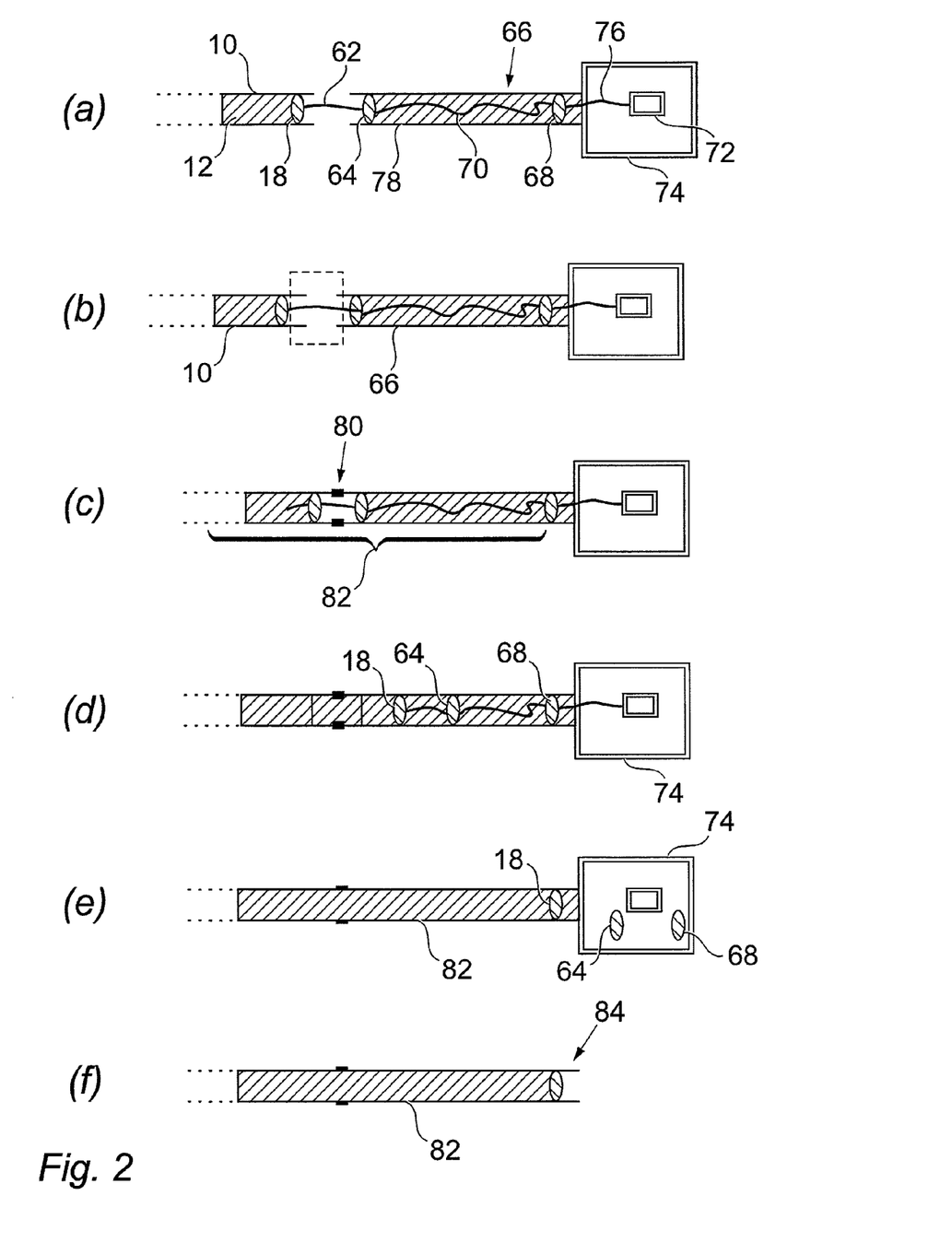
FIGS. 2(a)-(f) are diagrammatic cross-sectional views of a method of joining the first pipe section of FIG. 1(g) with a second pipe section with a fluid.

FIG. 2 (a) shows the downstream end of the first pipe section 10 having water 12 therein maintained by the first plug 18 (and the second plug 24 not shown in FIG. 2). The free side of the first plug 18 is connected by a short third line 62 to a third plug 64 (or second 'first plug') located at one (upstream) end of a second pipe section 66. The second pipe section 66 has the third plug 64 at one end thereof, and a fourth plug 68 (or second 'second' plug) at its other or downstream end. The third and fourth plugs 64, 68 are connected by a fourth line 70 therebetween. The other side of the fourth plug 68 is connected to a winch 72 in a clampable pressure chamber 74 by a further line 76, which clampable pressure chamber 74 may be the same or different to the clampable pressure chamber used in FIG. 1 (*g*) and/or shown in FIG. 4.

The method of:
locating the third and fourth plugs 64, 68;
filling the second pipe section 66 with a fluid 78, preferably being the same fluid such as water as the first fluid 12; and pressurising the second fluid 76;
are preferably the same or similar to the processes described above in relation to FIGS. 1 (*a*)-(*g*).

FIG. 2 (*b*) shows the bringing together of the ends of the first pipe section 10 and the second pipe section 66 so as to be joined, preferably welded using one or more tie-in-welds 80, to create a join 80 as shown in FIG. 2 (*c*). The first and second pipe sections 10, 66 now form a combined pipe section 82 because of the join 80. A coating may be applied to the outer wall of the combined pipe section 82 around the join 80, such as a field joint coating known in the art.

FIG. 2 (*d*) shows a method of equalising the pressure inside the length of the combined pipe section 82, wherein the first, third and fourth plugs, 18, 64, 68 are unlocked or otherwise prepared for being movable, and the winch 72 is operated to cause movement of the connected first, third and fourth plugs 18, 64, 68 through the connected lines 62, 70, 76. In this way, the first plug 18 is moved across the location of the join 80 to be present in the second pipe section 66, and the area previously absent of fluid in the first and second pipe sections 10, 66 beneath the join 80, is now filled with the fluids 12, 78, which combine to provide a single fluid in the combined pipe section 82.

Preferably, the first plug 18 is then relocated to be at the same or similar position previously occupied by the fourth plug 68, such that the first plug 18 becomes the final downstream plug of the combined pipe section 82 as shown in FIG. 2 (*e*), preferably with removal of the third and fourth plugs 64, 68 from the combined pipe section 82. The clampable pressure chamber 74 can then be removed to leave the combined pipe section 82, with one downstream 'end' plug as shown in FIG. 2 (*f*).

The new part of the combined pipe section 82 comprising the second pipe section 66 can now be spooled onto the reel using the same process as the spooling of the first pipe section 10. The free or downstream end 84 of the combined pipe section 82 is now able to be used for joining to another 'second' pipe section in a repeat of the steps and actions shown in relation to FIGS. 2 (*a*) to (*e*).

In this way, a plurality of bi-metallic pipe sections can be spooled onto a reel whilst maintaining internal hydrostatic pressure because of the presence of two plugs, one at each end of at least those pipe sections on the reel, and two plugs at each end of each new second pipe section to be added thereto.

Variants of pressurising a fluid in a pipe section are known in the art which are equally useable in the present invention as long as at least one of the first and second pipe sections maintains the fluid therein during the joining of such pipe sections together.

Figure 5:
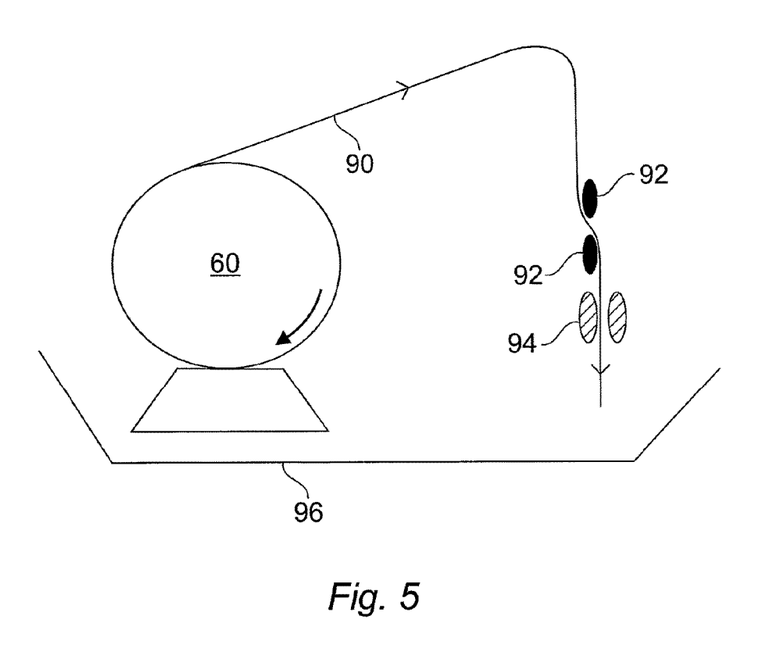
FIG. 5 shows a schematic reeled lay method.

FIG. 5 schematically shows a reel 60, from which a mounted bi-metallic pipeline preferably still maintaining an internal hydrostatic pressure, may be used in the reeled lay method of laying a marine pipeline. The reeled lay method of laying a marine pipeline is relatively quicker than the other main method of laying a marine pipeline, the stove piping method. Thus, it is preferred for economical reasons.

During the laying process, the marine pipeline 90 is un-spooled, passed through one or more straightners 92 and/or one or more tensioners 94, prior to passing below a vessel 96 to be laid in a marine environment. Methods of unlocking and removing the remaining plugs in a laid marine pipeline, and for equilibrating the pressure inside the pipeline with the environmental pressure, are known in the art. This may include the use or more ROVs and/or pig traps.

In particular, the present invention provide a method of spooling a plurality of bi-metallic lined pipe sections onto a reel for use in a subsequent reeled lay method. This therefore combines the benefit of using a bi-metallic pipeline, and the economy of the reeled lay method for laying the pipeline in a marine environment.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

What is claimed is:

1. A method of spooling a marine pipeline comprising a plurality of bi-metallic pipe sections onto a reel, the method comprising at least the steps of:
    (a) filling a first pipe section with a fluid;
    (b) spooling the first pipe section onto the reel;
    (c) filling a second pipe section with a fluid;
    (d) joining the first pipe section with the second pipe section while maintaining the fluid in a pressurized state in at least one of the first and second pipe sections; and
    (e) spooling the second pipe section onto the reel.

2. A method as claimed in claim 1, comprising pressurising the fluid in the first pipe section after step (a).

3. A method as claimed in claim 2 wherein the fluid is pressurised to between 5-25 bar.

4. A method as claimed in claim 1, comprising pressurising the fluid in the second pipe section after step (c).

5. A method as claimed in claim 4 wherein the fluid is pressurised to between 5-25 bar.

6. A method as claimed in claim 1, wherein the bi-metallic pipe sections are lined pipe sections.

7. A method as claimed in claim 1, wherein step (a) further comprises:
    locating a first plug at one end of the first pipe section;
    the filling of the first pipe section with the fluid;
    locating a second plug at the other end of the first pipe section;
    pressurising the fluid; and
    locking the second plug to maintain the pressurised fluid in the first pipe section.

8. A method as claimed in claim 1, wherein step (c) further comprises:
    locating a first plug at one end of the second pipe section;
    the filling of the second pipe section with the fluid;
    locating a second plug at the other end of the second pipe section;
    pressurising the fluid; and
    locking the second plug to maintain the pressurised fluid in the second pipe section.

9. A method as claimed in claim 1, wherein two or more plugs are attached to provide combined movement.

10. A method as claimed in claim 1, comprising providing an absence of pressurised fluid in the areas of the first and second pipe sections being joined in step (d).

11. A method as claimed in claim 10, comprising subsequently filling the first and second pipe sections beneath the joint with the fluid.

12. A method as claimed in claim 1, comprising repeating steps (c)-(e) to join and spool one or more further pipe sections onto the reel.

13. A method of claim 1, wherein the joining comprises;
   (a) connecting opposing plugs of the first and second pipe sections;
   (b) joining the first and second pipe sections;
   (c) filling the first and second pipe sections beneath the joint with the fluid; and
   (d) moving one of the connected plugs across the joint.

14. A method as claimed in claim 1, wherein the fluid is water.

15. A method as claimed in claim 1, wherein step (c) is performed before step (d).

16. A method as claimed in claim 1, wherein step (d) is performed before step (c).

* * * * *